US011264660B2

(12) United States Patent
Otsuka et al.

(10) Patent No.: US 11,264,660 B2
(45) Date of Patent: Mar. 1, 2022

(54) ELECTRIC STORAGE DEVICE

(71) Applicant: Murata Manufacturing Co., Ltd., Nagaokakyo (JP)

(72) Inventors: Masahiro Otsuka, Nagaokakyo (JP); Toru Kawai, Nagaokakyo (JP); Masashi Higuchi, Nagaokakyo (JP); Takuya Kenko, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 268 days.

(21) Appl. No.: 16/186,981

(22) Filed: Nov. 12, 2018

(65) Prior Publication Data

US 2019/0081286 A1 Mar. 14, 2019

Related U.S. Application Data

(63) Continuation of application No. PCT/JP2017/005429, filed on Feb. 15, 2017.

(30) Foreign Application Priority Data

May 31, 2016 (JP) .............................. JP2016-108293

(51) Int. Cl.
*H01M 2/02* (2006.01)
*H01M 10/04* (2006.01)
(Continued)

(52) U.S. Cl.
CPC .......... *H01M 50/103* (2021.01); *H01G 11/26* (2013.01); *H01G 11/78* (2013.01);
(Continued)

(58) Field of Classification Search
CPC ................................................. H01M 2/0217
See application file for complete search history.

(56) References Cited

U.S. PATENT DOCUMENTS 9,225,034 B2   12/2015   Ryu et al.
9,325,029 B1    4/2016   Chul et al.
(Continued)

FOREIGN PATENT DOCUMENTS

CN   101340009 A   1/2009
JP   2012124182 A  6/2012
(Continued)

OTHER PUBLICATIONS

Overview of Materials for Aluminum Alloy, MatWeb, www.matweb.com/search/DataSheet.aspx?MatGUID=ab8aeb2d293041c4a844e397b5cfbd4e. (Year: 2021).*
(Continued)

*Primary Examiner* — Stephan J Essex
(74) *Attorney, Agent, or Firm* — Arent Fox LLP (57) ABSTRACT

An electrical storage device includes a case having first and second opposed main walls which face one another and at least one side wall coupled the first and second main walls. The case having a generally rectangular shape with outer corners and includes a cutout part having inner corners. An integrated electrode body is located in the case and is joined to the first main wall. The integrated body includes a first electrode, a second electrode, and a separator disposed between the first and second electrodes. The electrode body has a bending strength which is higher than a bending strength of the first main wall. An electrolyte fills the case.

17 Claims, 6 Drawing Sheets

(51) Int. Cl.
*H01M 4/02* (2006.01)
*H01G 11/28* (2013.01)
*H01G 11/52* (2013.01)
*H01G 11/80* (2013.01)
*H01M 50/103* (2021.01)
*H01G 11/78* (2013.01)
*H01G 11/26* (2013.01)
*H01M 50/10* (2021.01)
*H01M 50/40* (2021.01)
*H01M 50/46* (2021.01)
*H01M 50/116* (2021.01)
*H01M 10/058* (2010.01)
*H01M 50/463* (2021.01)

(52) U.S. Cl.
CPC .............. *H01G 11/80* (2013.01); *H01M 4/02* (2013.01); *H01M 10/0436* (2013.01); *H01M 50/10* (2021.01); *H01M 50/116* (2021.01); *H01M 50/40* (2021.01); *H01M 50/46* (2021.01); *H01G 11/28* (2013.01); *H01G 11/52* (2013.01); *H01M 10/0459* (2013.01); *H01M 10/058* (2013.01); *H01M 50/463* (2021.01); *H01M 2220/30* (2013.01)

(56) References Cited

U.S. PATENT DOCUMENTS

| | | | | |
|---|---|---|---|---|
| 2001/0051298 A1* | 12/2001 | Hanafusa | .......... | H01M 10/0436 429/162 |
| 2008/0038636 A1* | 2/2008 | Suguro | ................ | H01M 4/137 429/213 |
| 2012/0208065 A1* | 8/2012 | Schroeter | ............ | H01M 50/557 429/130 |
| 2013/0252065 A1* | 9/2013 | Ueda | ................ | H01M 10/0436 429/127 |
| 2013/0260214 A1* | 10/2013 | Ueda | ................ | H01M 10/0585 429/162 |
| 2014/0011070 A1* | 1/2014 | Kim | ...................... | H01M 2/021 429/152 |
| 2014/0050959 A1 | 2/2014 | Ryu et al. | | |
| 2015/0037664 A1* | 2/2015 | Kang | ...................... | H01M 2/02 429/179 |
| 2015/0171383 A1* | 6/2015 | Ahn | .................... | H01M 2/1653 429/94 |
| 2015/0372353 A1 | 12/2015 | Ryu et al. | | |
| 2016/0049687 A1 | 2/2016 | Yang et al. | | |

FOREIGN PATENT DOCUMENTS

| | | | |
|---|---|---|---|
| JP | 2013016523 A | * | 1/2013 |
| JP | 2013161674 A | | 8/2013 |
| JP | 2014522558 A | | 9/2014 |
| JP | 2015146252 A | | 8/2015 |
| JP | 2015536036 A | | 12/2015 |
| JP | 2016506606 A | | 3/2016 |

OTHER PUBLICATIONS

International Search Report issued for PCT/JP2017/005429, dated Mar. 21, 2017.

Written Opinion of the International Searching Authority issued for PCT/JP2017/005429, dated Mar. 21, 2017.

* cited by examiner

ELECTRIC STORAGE DEVICE

CROSS REFERENCE TO RELATED APPLICATIONS

The present application is a continuation of International application No. PCT/JP2017/005429, filed Feb. 15, 2017, which claims priority to Japanese Patent Application No. 2016-108293, filed May 31, 2016, the entire contents of each of which are incorporated herein by reference.

TECHNICAL FIELD

The present invention relates to an electric storage device.

BACKGROUND OF THE INVENTION

Conventionally, electric storage devices have been used as power sources for various kinds of electronic devices. For example, Japanese Patent Application Laid-open No. 2015-146252 (Patent Document 1) discloses an electric storage device including an electrode assembly (electrode body) housed in a case. In the electric storage device disclosed in Patent Document 1, a spacer for adjusting the gap between the electrode assembly and the inner surface of the case is provided in the case. Specifically, spacers are provided on both sides of the electrode assembly in the case. In other words, in the electric storage device disclosed in Patent Document 1, a plurality of spacers are provided in the case.

In order to reduce the size of certain electronic devices, it is often necessary to use an electrical storage device having a non-rectangular shape that fits in a non-rectangular opening in the electronic storage device. For this reason, an electrical storage device not having a rectangular shape in plan view is desired.

Recently, reduction of the thicknesses of electronic devices has been achieved, and along with this reduction, reduction of the thicknesses of electrical storage devices has been increasingly required.

It is a main object of the present invention to provide a thin electrical storage device not having a rectangular shape in plan view.

BRIEF DESCRIPTION OF THE INVENTION

In accordance with one aspect of the invention, an electrical storage device comprises a case including first and second opposed main walls which face one another and at least one side wall coupled the first and second main walls. The case has a substantially rectangular shape with outer corners and includes a cutout part having inner corners. An integrated electrode body is located in the case and is joined to the first main wall. The integrated body includes a first electrode, a second electrode, and a separator disposed between the first and second electrodes. The electrode body has a bending strength which is higher than the bending strength of the first main wall. An electrolyte impregnates at least part of the electrode body.

The first main wall of the case preferably has a thickness of not more than 200 μm and more preferably not more than 100 μm.

In a further aspect of the invention, the integrated body is joined to the first main wall by a joining part and a virtual straight line connects a first of the outer corners of the case and a first of the inner corners of the cut out portion. The first outer corner is closer to the first inner corner than any of the other inner corners of the cut out portion.

In another aspect of the invention, the cut out portion is U-shaped and has two inner corners.

In another aspect of the invention, the cut out portion is generally L-shaped and has a single inner corner.

In another aspect of the invention, the cut out portion is generally U-shaped and the case is generally C-shaped. In this case, it is preferred that a second virtual line extends from a second one of the outer corners to the case to a second one of the inner corners of the cut out portion and passes through the joining part. The second outer corner is closer to the second inner corner than the first inner corner of the cut out portion.

In a further aspect of the invention, the integrated body is joined to the first main wall by first and second joining parts and a first virtual straight line connects a first of the outer corners of the case and a first of the inner corners of the cut out portion. The first outer corner is closer to the first inner corner than any of the other inner corners of the cut out portion. A second virtual straight line connects a second of the outer corners of the case and a second of the inner corners of the cut out portion. The second outer corner is closer to the second inner corner than any of the other inner corners of the cut out portion.

In a preferred embodiment, the case is equipotential with an electrode positioned on an outermost layer of the electrode body.

In an embodiment of the invention, the integrated body is joined to the first main wall by a plurality of the joining parts.

With the foregoing configurations, deformation of the first main wall can be more effectively reduced. As a result, the thickness of the electrical storage device can be further reduced.

In an aspect of the present invention, a plurality of the joining parts are preferably separately provided. In this case, a flow path of the electrolyte is formed between the joining parts which are adjacent to each other, which facilitates flow of the electrolyte at charging and discharging. Accordingly, the electric storage device can have an improved charging and discharging property.

The present invention can provide a thin electrical storage device not having a substantially rectangular shape in plan view.

DESCRIPTION OF THE PREFERRED EMBODIMENTS

Exemplary preferred embodiments of the present invention will be described below. The following embodiments are merely exemplary and the present invention is not limited to the following embodiments.

In drawings referred to in the embodiments and the like, components having effectively identical functions will be denoted by an identical reference sign. The drawings referred to in the embodiments and the like are schematically illustrated. For example, the dimensional ratios of objects illustrated in the drawings are different from the dimensional ratio of objects in reality in some cases. For example, the dimensional ratios of objects are also different between the drawings in some cases. For example, specific dimensional ratios of objects should be determined based on the following description.

First Embodiment

An electrical storage device 1 illustrated in FIGS. 1 to 4 includes an electrolyte 4 (see FIG. 3) such as electrolyte or gel electrolyte. The electric storage device 1 may be, for example, a battery such as a secondary battery, or a capacitor such as an electric double-layer capacitor.

Figure 2:
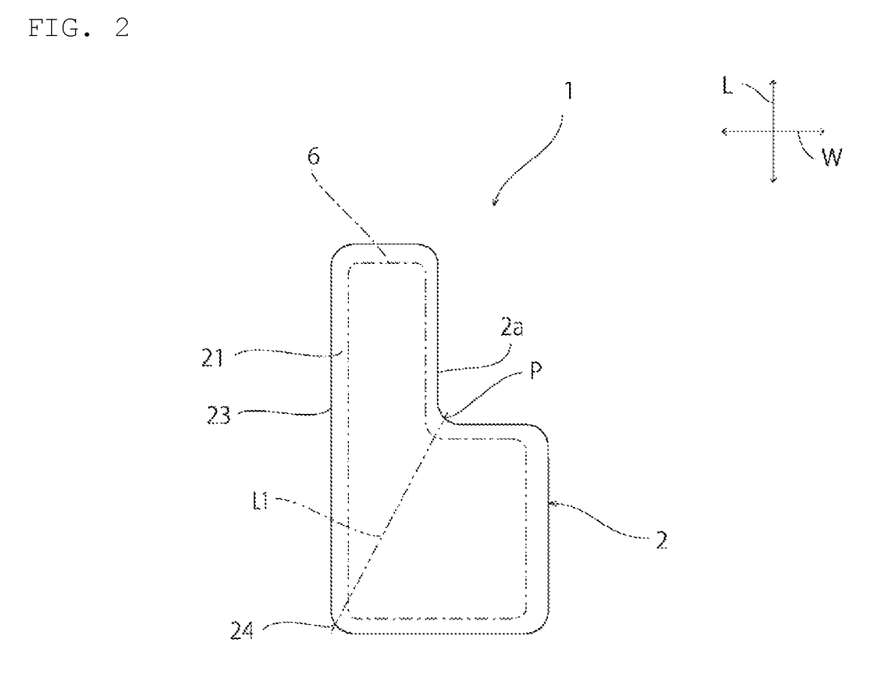
FIG. 2 is a schematic plan view of the electric storage device according to the first embodiment.
Figure 3:
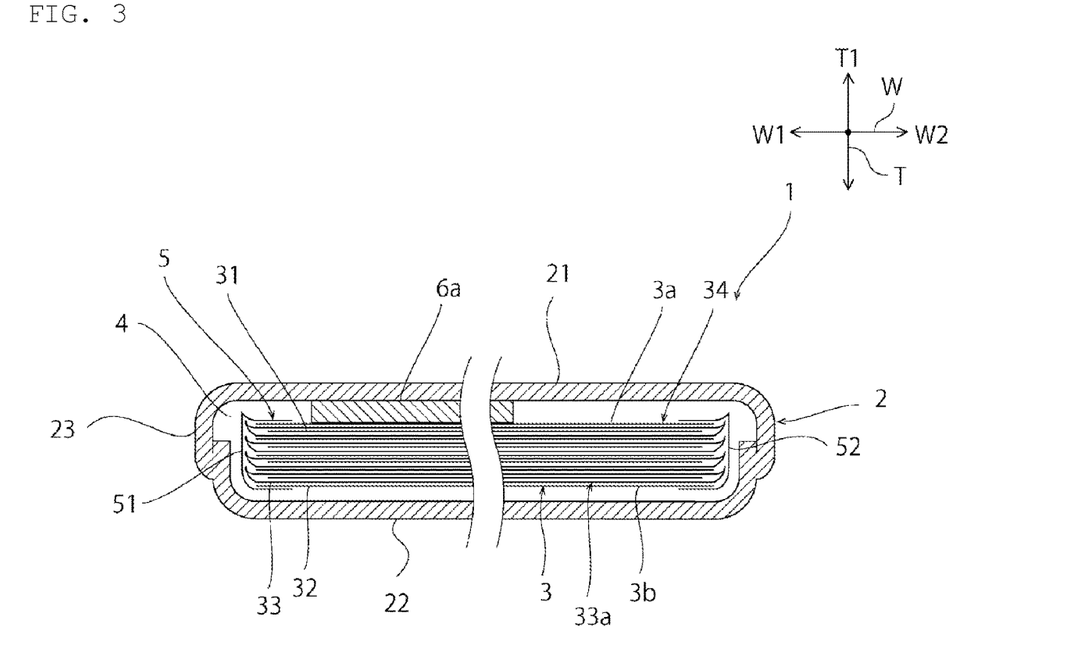
FIG. 3 is a schematic cross-sectional view taken along line III-III in FIG. 1.

As illustrated in FIG. 3, the electric storage device 1 includes a case 2 having a substantially rectangular parallelepiped shape but including a cutout part 2a in plan view (i.e., as viewed in FIG. 2). In this embodiment, the case 2, including the cut out portion, has rounded corners in plan view including the cutout part 2a with rounded corners view.

The case 2 includes first and second main walls 21 and 22 which face one another and are spaced apart from one another in a thickness direction T. The first and second main walls 21 and 22 are connected with each other by a side wall 23. The thicknesses of the first and second main walls 21 and 22 are preferably 200 μm or smaller, and 100 μm or smaller, respectively. The thicknesses of the main walls 21 and 22 can be obtained by measuring the thicknesses of the main walls 21 and 22 at their centers in plan view using a digital micro meter.

The case 2 is preferably made of a material which is unlikely to react with the electrolyte 4 to be described later. The case 2 may be made of an insulator or a conductor such as metal. For example, the case 2 may be made of a conductor having an inner surface coated with an insulation coating film.

Figure 1:
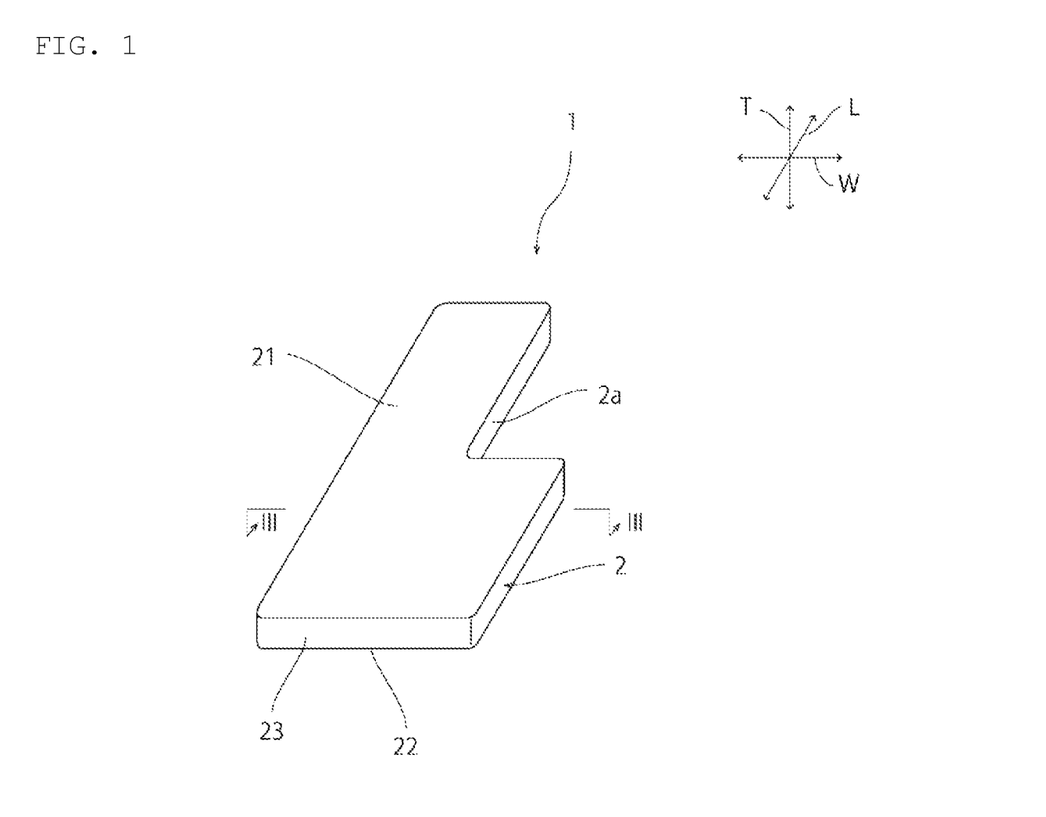
FIG. 1 is a schematic perspective view of an electric storage device according to a first embodiment.

Although not illustrated in FIG. 1, the case 2 may be provided with an electrode terminal. The case 2 may be provided with both of a positive electrode terminal and a negative electrode terminal. Alternatively, one of the terminals may be provided, and the other may be achieved by the case 2 made of a conductor.

As illustrated in FIG. 3, an electrode body 3 is disposed inside the case 2. The electrode body 3 includes a plurality of rectangular positive electrodes 31, a plurality of rectangular negative electrodes 32, and a plurality of separators 33. Each positive electrode 31 is separated from its adjacent negative electrode 32 by a respective separator 33 interposed there between in a thickness direction T. The separator 33 insulates its associated positive electrode 31 from its associated negative electrode 32. In the preferred embodiment, pairs of adjacent separators which straddle a given positive electrode 31 are connected together at their side edges to form a bag shaped separator 33a with the positive electrode 31 disposed therein. However, the invention is not so limited and the adjacent separators need not be joined into a bag shape. As another alternative structure, a sheet or zigzag separator may be provided between the positive electrode and the negative electrode.

The electrode body 3 of the present embodiment is obtained by laminating a plurality of sheet shaped positive electrodes 31, a plurality of sheet shaped separator 33, and a plurality of sheet shaped negative electrodes 32 together. However, the present invention is not limited thereto. The electrode body is not particularly limited as long as the electrode body has a configuration that allows accumulation of electrical power. For example, the electrode body may be achieved by a wound body obtained by winding a lamination sheet in which a positive electrode, a separator, and a negative electrode are laminated in the stated order. However, the electrode body is preferably a laminated electrode body to reduce the thickness of the electric storage device.

The configuration of the positive electrode 31 may be determined as appropriate in accordance with the kind of the electric storage device 1. For example, when the electric storage device 1 is a secondary battery, the positive electrode 31 may include a positive electrode collector, and an active material layer provided on at least one surface of the positive electrode collector. For example, when the electric storage device 1 is an electric double-layer capacitor, the positive electrode 31 may include a positive electrode collector, and a polarizable electrode layer provided on at least one surface of the positive electrode collector. Typically, the positive electrode 31 includes a binding agent. Specifically, the binding agent is included in, for example, the positive-electrode active material layer or polarizable electrode layer of the positive electrode 31.

The configuration of the negative electrode 32 may be determined as appropriate in accordance with the kind of the electric storage device 1. For example, when the electric storage device 1 is a secondary battery, the negative electrode 32 may include a negative electrode collector, and an active material layer provided on at least one surface of the negative electrode collector. For example, when the electric storage device 1 is an electric double-layer capacitor, the negative electrode 32 may include a negative electrode collector, and a polarizable electrode layer provided on at least one surface of the negative electrode collector. Typically, the negative electrode 32 includes a binding agent. Specifically, the binding agent is included in, for example, the negative-electrode active material layer or polarizable electrode layer of the negative electrode 32.

Each of the separators 33 may be, for example, formed of a porous sheet including open cells through which ions in an electrolyte are movable. The separators 33 may be made of, for example, polypropylene, polyethylene, polyimide, cellulose, aramid, polyvinylidene fluoride, or Teflon (registered trademark). The separators 33 may have a surface covered by a ceramic court layer or a bonding layer. The surface of the separators 33 may have a bonding property. The separators 33 may be a single-layer film made of one kind of material, or may be a composite film or multi-layered film made of one or two or more kinds of material.

In the electric storage device 1, a plurality of sets of positive/negative electrode pairs are provided. Each positive/negative electrode pair comprises a respective positive electrode 31, a respective separator 33, and a respective negative electrode 32 that are laminated together in the stated order. The plurality of positive/negative electrode pairs are stacked together to form a laminated body 34. The electrode body 3 further includes a pair of tapes 51, 52 which surround at least a portion of the laminated body 34 to form the integrated electrode body 3. The base material of the tapes 51, 52 may be, for example, polypropylene, polyethylene terephthalate, or polyimide. When the tapes 51, 52 are an adhesive tape, an adhesive agent may be made of acrylic, silicone, or rubber-based material, having electrolyte resistance. However, the method of integrating the positive electrodes, the separators, and the negative electrodes is not particularly limited. For example, each positive electrode may be bonded with its corresponding separator, and the separator may be bonded with its corresponding negative electrode, thereby integrating the electrode body 3.

The first tape 51 extends from the lower main surface 3b of the electrode body 3, upwardly across the W1 side (the left side as viewed in FIG. 3) of the electrode body 3 and onto the upper surface 3a of the electrode body 3. The first tape 51 bends a left end part of each of the separators 33 on the W1 side upwardly (as viewed in FIG. 3) toward the T1 side in the thickness direction T and fixes the left end parts if the separators in this bent state.

The second tape 52 extends from the lower main surface 3b of the electrode body 3, upwardly across the W2 side (the right side as viewed in FIG. 3) of the electrode body 3 and onto the upper surface 3a of the electrode body 3. The second tape 52 bends a right end part of each of the separators 33 on the W1 side upwardly (as viewed in FIG. 3) toward the T1 side in the thickness direction T and fixes the right end parts if the separators in this bent state.

The present embodiment describes the example in which the electrode body 3 is integrated by the tapes 51 and 52. However, the present invention is not limited to this configuration. For example, each positive electrode may be bonded with the corresponding adjacent separator, and each negative electrode may be bonded with the corresponding adjacent separator, thereby integrating the electrode body 3.

The integrated electrode body 3 preferably has bending strength which is higher than the bending strength of the first main wall 21 of the case 2. Specifically, the bending strength of the electrode body 3 is preferably more than two times larger than the bending strength of the first main wall 21 of the case 2 and more preferably more than three times larger than the bending strength of the first main wall 21 of the case 2.

In the electric storage device 1, the case 2 is preferably equipotential with an electrode positioned on the outermost layer of the electrode body 3. In such a case, no short-circuit will occur even when the case 2 contacts the electrode positioned on the outermost layer of the electrode body 3.

The electrolyte 4 preferably fills the case 2 and impregnates the electrode body 3.

As illustrated in FIG. 3, the electrode body 3 and the case 2 are joined together by a bonding layer 6a. Thus, a joining part 6 (see FIG. 2) between the electrode body 3 and the first main wall 21 is formed by the bonding layer 6a. More specifically, as illustrated in FIG. 2, the joining part 6 is provided over a virtual straight line L1 in plan view. The virtual straight line L1 connects a corner 24 and a site P. The corner 24 is formed by a first side surface facing to a side surface forming the cutout part 2a and a second side surface intersecting with the first side surface. The site P is positioned nearest to the corner on the side surface forming the cutout part 2a.

In the present embodiment the electrode body 3 is joined with the first main wall 21 but not with the second main wall 22. However, the present invention is not limited to this configuration. For example, the electrode body may be joined with the first main wall and also with the second main wall.

While preferred, the electrode body and the case do not need to be joined together by bonding through the bonding layer. In the present invention, for example, the electrode body and the case may be directly joined together.

The bonding layer 6a is not particularly limited, but is preferably unlikely to react with the electrolyte 4. Specifically, the bonding layer 6a is preferably made of resin or a resin composition containing resin. More specifically, the bonding layer 6a is preferably made of at least one material selected from the group consisting of acrylic resin such as polyacrylonitrile (PAN) or polyacrylic acid (PAA), synthetic rubber such as styrene butadiene rubber (SBR), isoprene rubber, or ethylene propylene rubber (EPDM), natural rubber, cellulose, carboxymethyl cellulose (CMC), polyvinyl chloride (PVC), synthetic rubber such as styrene butadiene rubber (SBR), isoprene rubber, or ethylene propylene rubber (EPDM), natural rubber, polyimide (PI), polyamide (PA), polyethylene (PE), polypropylene (PP), polyethylene terephthalate (PET), polyether nitrile (PEN), polyvinylidene fluoride (PVDF), polytetrafluoroethylene (PTFE), hexafluoropropylene, fluorine resin such as perfluoroalkyl vinyl ether (PFA) or polyvinyl fluoride (PVF), fluorine rubber, silicone resin, and epoxy resin, or a resin composition containing the selected material (for example, mixture consisting of two or more kinds thereof or copolymer).

The resin included in the bonding layer 6a is preferably the same type of resin as that used in the binding agent included in each positive electrode and/or negative electrode 31, 32. In addition, the resin included in the bonding layer 6a is preferably the same type of resin used as the binding agent included in the positive and/or electrode 31, 32 bonded by the bonding layer 6a. In the present embodiment, an electrode of the electrode body 3 positioned on a side (the T1 side) closest to the inner surface of the case 2 is the negative electrode 32, and the negative electrode 32 is bonded through the bonding layer 6a. For this reason, the binding agent included in the negative electrode 32 and the bonding layer 6a preferably both contain SBR. The bonding layer may contain a viscous agent including, for example, carboxymethyl cellulose (CMC) for adjusting the viscosity of slurry at formation of the bonding layer.

In the positive and/or negative electrode 31, 32, the active material layer may be provided on one surface of the collector, or the active material layers may be provided on both surfaces of the collector. The negative-electrode active material layer is preferably provided on one surface of the negative electrode collector to reduce the thickness of the electric storage device 1. As described above, the first main wall 21 is joined to the electrode body 3 which has a bending strength which is higher than the bending strength of the first main wall 21. As a result, the first main wall 21 is unlikely to deform and the thickness of the first main wall 21 can be reduced. For example, the first main wall 21 may have a thickness of 200 μm or smaller, preferably 100 μm or smaller. Since the thickness of the wall can be reduced, the thickness of the electric storage device 1 can be reduced.

Since, the second main wall 22 is preferably joined to the electrode body 3 which has a high bending strength, the thickness of the second main wall 22 can be reduced. For example, the thickness of the second main wall 22 may be 200 μm or smaller, preferably 100 μm or smaller. Since the thickness of the second main wall can be reduced, the thickness of the electric storage device 1 can be further reduced.

In the electrical storage device 1, the first main wall 21 is most likely to deform at a part where the virtual straight line L1 is positioned. However, in the electrical storage device 1, the joining part 6 is provided over the virtual straight line L1. As a result, the part of the first main wall 21 that is most likely to deform is reinforced by the electrode body 3 which has a high bending strength. Thus, the thickness of the first main wall 21 can be further reduced. As a result, the thickness of the electrical storage device 1 can be further reduced.

For the same reason, when the second main wall 22 and the electrode body 3 are joined together, the joining part there between is preferably provided over the virtual straight line L1.

Other exemplary preferable embodiments of the present invention will be described below. In the following description, a component having a function effectively identical to that in the above-described first embodiment will be denoted by an identical reference sign, and description thereof will be omitted.

Second Embodiment

Figure 4:
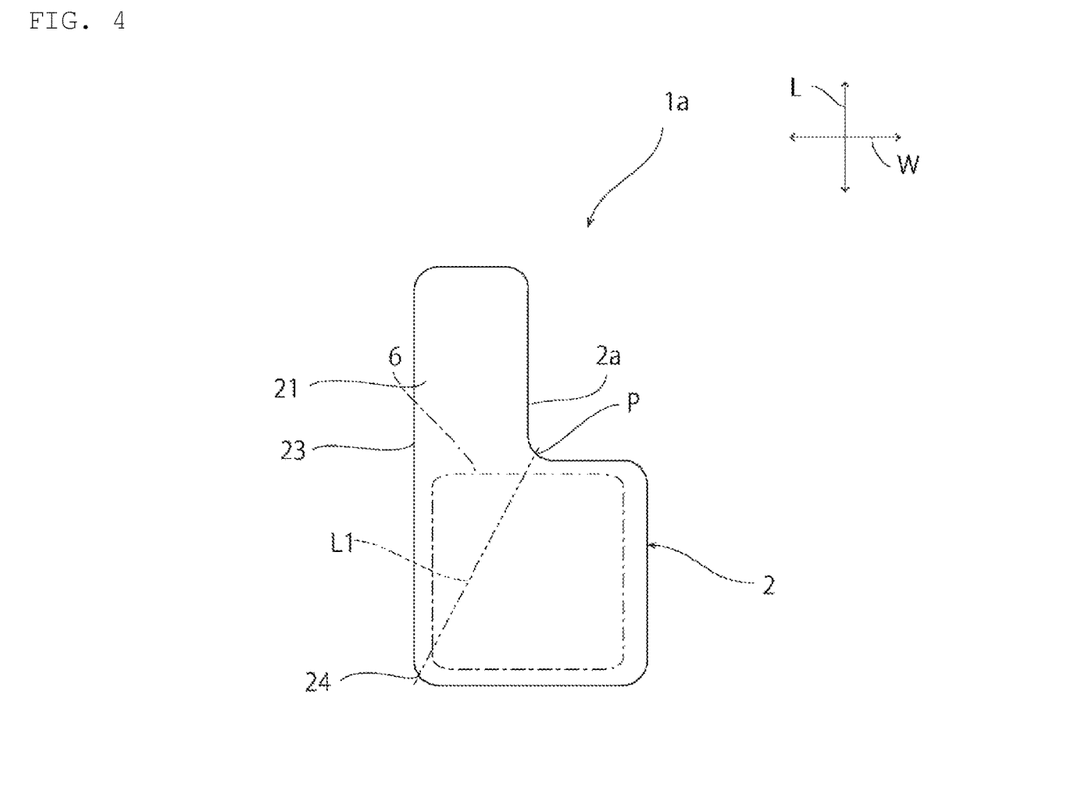
FIG. 4 is a schematic plan view of an electrical storage device according to a second embodiment.

FIG. 4 is a schematic plan view of an electrical storage device 1a according to a second embodiment.

The first embodiment describes the example in which the first main wall 21 is effectively entirely joined with the electrode body 3. However, the present invention is not limited to this configuration. For example, as in the electrical storage device 1a illustrated in FIG. 4, part of the first main wall 21 may be joined with part of the electrode body 3. Also in this case, similarly to the first embodiment, the thickness of the electrical storage device 1 can be reduced.

Like the first embodiment, in this second embodiment the joining part 6 is preferably provided over the virtual straight line L1.

Third Embodiment

Figure 5:
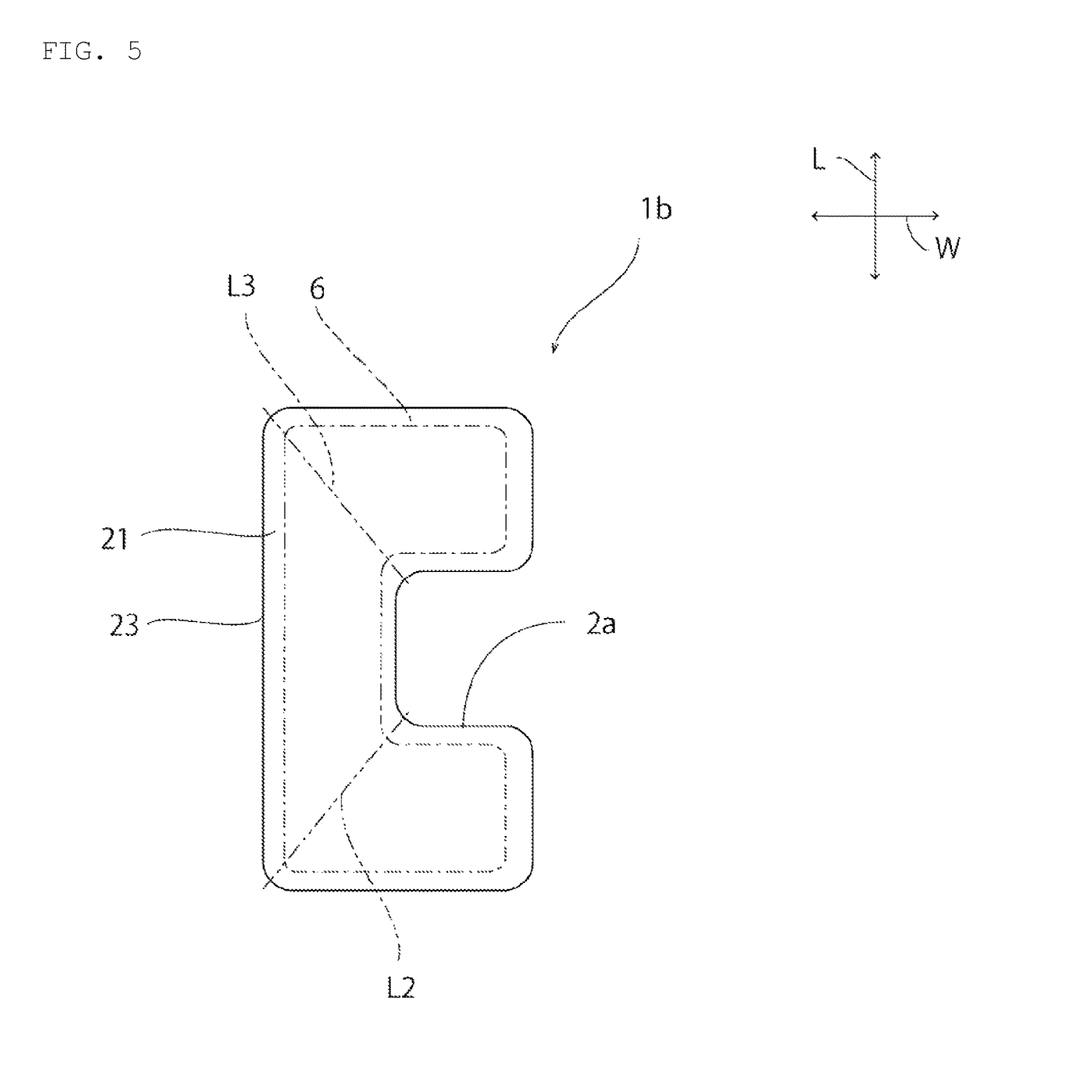
FIG. 5 is a schematic plan view of an electrical storage device according to a third embodiment.

FIG. 5 is a schematic plan view of an electrical storage device 1b according to a third embodiment.

The first embodiment describes the example in which the cutout part 2a is provided at a corner of the case 2. However, the present invention is not limited to this configuration. For example, as illustrated in FIG. 5, the cutout part 2a may be provided at one side surface of the case 2. In this case, there are two virtual straight lines L12 and L3. To reduce the thicknesses of the first main wall 21 and the electrical storage device 1b, the joining part 6 is preferably provided over at least one of the two virtual straight lines L12 and L3, more preferably provided over both virtual straight lines L12 and L3.

Fourth Embodiment

Figure 6:
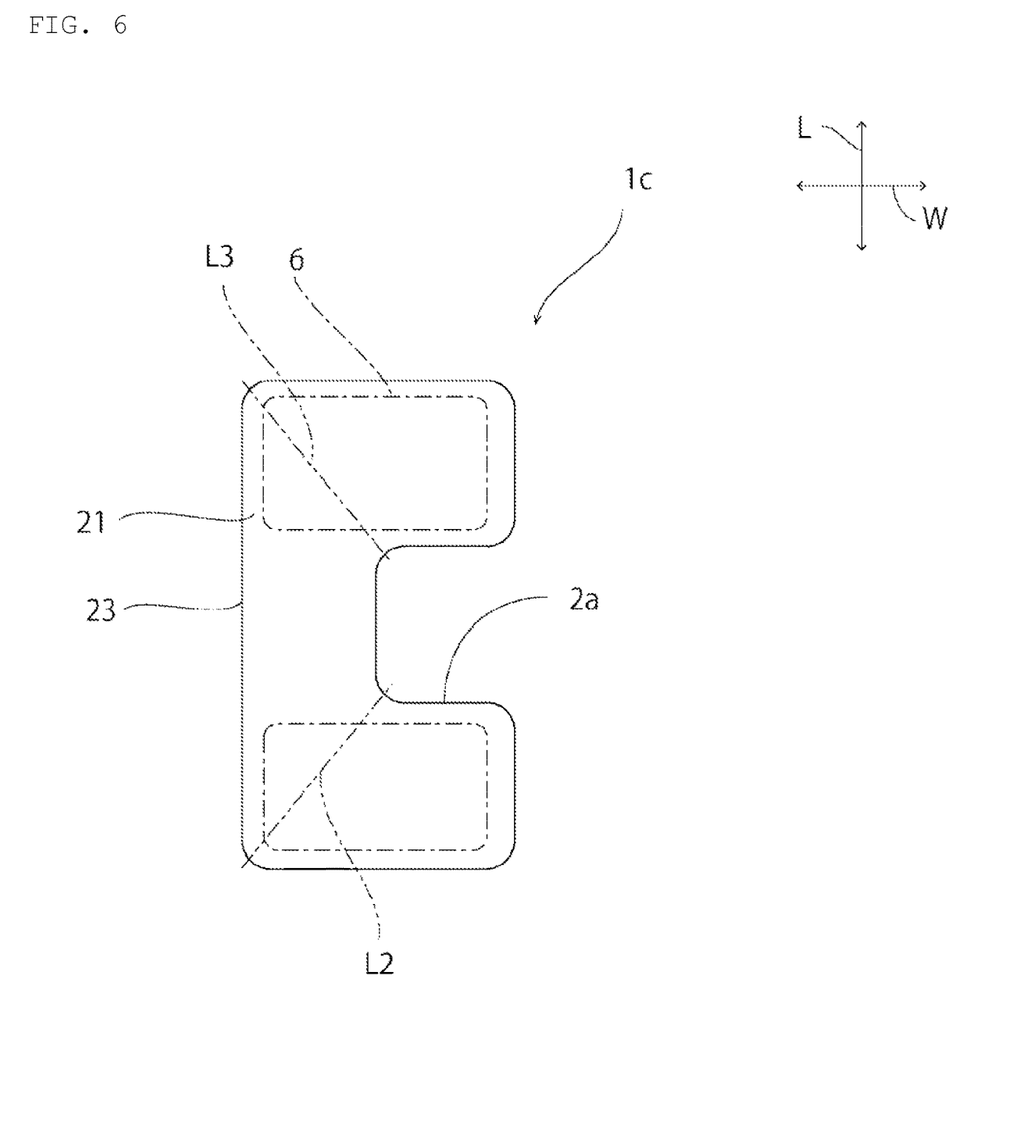
FIG. 6 is a schematic plan view of an electrical storage device according to a fourth embodiment.

FIG. 6 is a schematic plan view of an electrical storage device 1c according to a fourth embodiment.

The first to third embodiments describe the example in which the single joining part 6 is provided. However, the present invention is not limited to this configuration. As illustrated in FIG. 6, for example, a plurality of joining parts 6 may be provided.

In this embodiment one of two joining parts 6 is provided over a virtual straight line L12 and the other of the two joining parts 6 is provided over a virtual straight line L3. This allows further reduction of the thickness of the electrical storage device 1c.

When a plurality of joining parts 6 are provided as in the present embodiment, the plurality of joining parts 6 are preferably separated from one another. In this case, a flow path of the electrolyte is formed between the adjacent joining parts 6, which facilitates flow of the electrolyte at charging and discharging of the electrical storage device 1c. Thus, the electrical storage device 1 can have an improved charging and discharging property.

Fifth Embodiment

Figure 7:
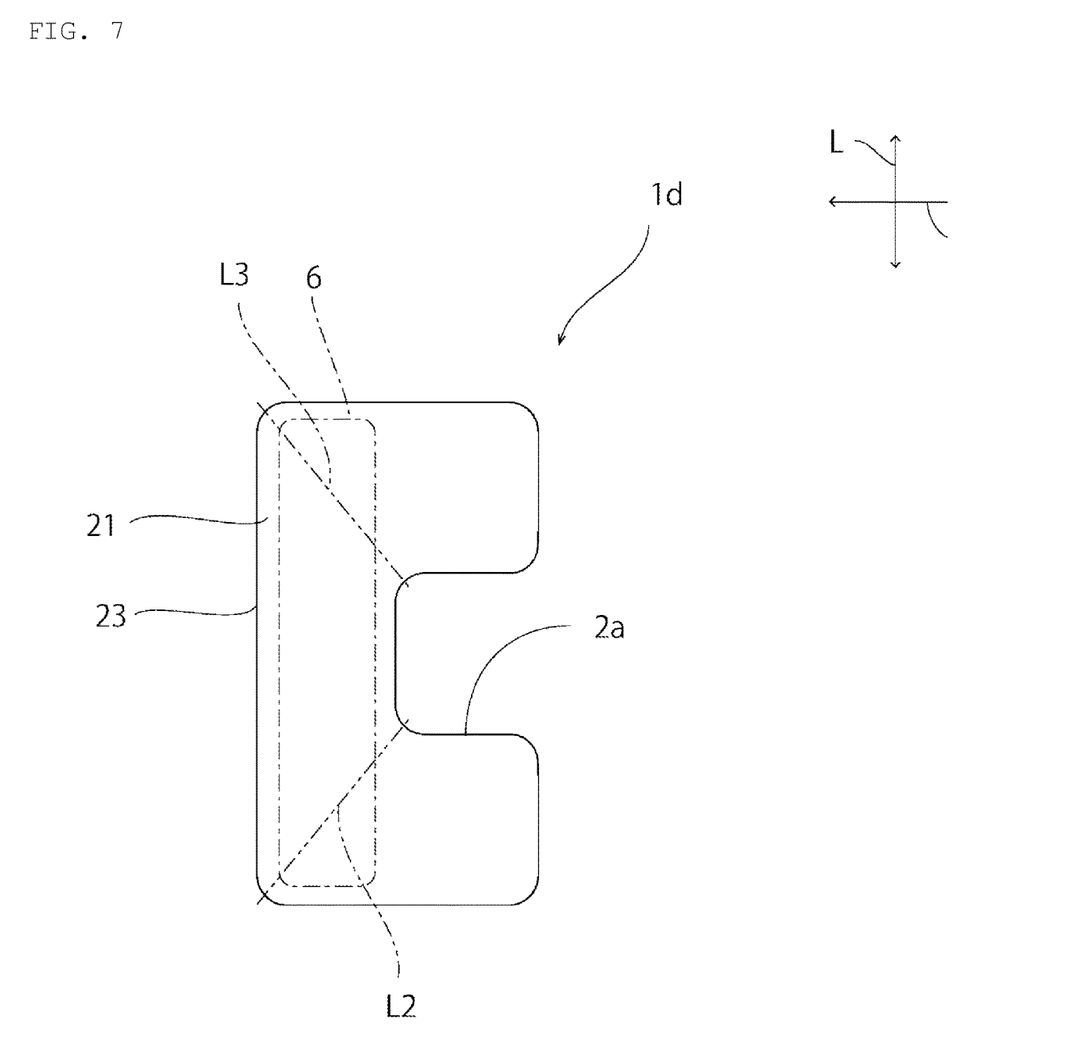
FIG. 7 is a schematic plan view of an electrical storage device according to a fifth embodiment.

FIG. 7 is a schematic plan view of an electrical storage device according to a fifth embodiment.

The third embodiment describes the example in which the first main wall 21 is effectively entirely joined with the electrode body 3. However, the present invention is not limited to this configuration. For example, part of the first main wall 21 may be joined with part of the electrode body 3 as in an electrical storage device 1d illustrated in FIG. 7. Also in this case, similarly to the first embodiment, the thickness of the electrical storage device 1 can be reduced.

DESCRIPTION OF REFERENCE SYMBOLS 1, 1a, 1b, 1c, 1d: Electric storage device
2: Case
2a: Cutout part
3: Electrode body
3a: First main surface
3b: Second main surface
4: Electrolyte
5: Tape
6: Joining part
6a: Bonding layer
21: First main wall
22: Second main wall
23: Side wall
24: Corner
31: Positive electrode
32: Negative electrode
33: Separator
33a: Bag-shaped separator
34: Laminated body
51: First tape
52: Second tape
L1, L2, L3: Virtual straight line

The invention claimed is:
1. An electrical storage device comprising:
   a metal case including first and second opposed main walls which face one another and at least one side wall coupled to the first and second main walls, the case having a substantially rectangular shape with outer corners and including a cutout part having at least one inner corner;
   a laminated, integrated electrode body located in the case and being joined to the first main wall of the case, the integrated body including a plurality of electrode pairs, each of the electrode pairs including a first electrode, a second electrode, and a separator disposed between the first and second electrodes, the electrode body having a bending strength which is higher than a bending strength of the first main wall;
   an electrode positioned on an outermost layer of the electrode body and being coupled to the metal case such that the metal case and the electrode are equipotential; and
   an electrolyte which impregnates at least part of the electrode body.
2. The electrical storage device according to claim 1, wherein the first main wall of the case has a thickness of not more than 200 μm.

3. The electrical storage device according to claim 1, wherein the first main wall of the case has a thickness of not more than 100 μm.

4. The electrical storage device according to claim 1, wherein:
   the integrated body is joined to the first main wall by a joining part; and
   a virtual straight line connecting a first of the outer corners of the case and a first of the inner corners of the cut out portion and extending across the joining part, the first outer corner being closer to the first inner corner than any of the other inner corners of the cut out portion.

5. The electrical storage device according to claim 4, wherein the cut out portion is U-shaped and has two inner corners.

6. The electrical storage device according to claim 4, wherein the cut out portion is generally L-shaped and has a single inner corner.

7. The electrical storage device according to claim 4, wherein the cut out portion is generally U-shaped and the case is generally C-shaped.

8. The electrical storage device according to claim 7, wherein a second virtual line extending from a second of the outer corners of the case to a second of the inner corners of the cut out portion extends across the joining part, the second outer corner being closer to the second inner corner than the first inner corner of the cut out portion.

9. The electrical storage device according to claim 1, wherein:
   the integrated body is joined to the first main wall by first and second joining parts; and
   a first virtual straight line connecting a first of the outer corners of the case and a first of the inner corners of the cut out portion extending over the first joining part, the first outer corner being closer to the first inner corner than any of the other inner corners of the cut out portion; and
   a second virtual straight line connecting a second of the outer corners of the case and a second of the inner corners of the cut out portion extending over the second joining part, the second outer corner being closer to the second inner corner than any of the other inner corners of the cut out portion.

10. The electrical storage device according to claim 1, wherein the integrated body is joined to the first main wall by a plurality of joining parts.

11. The electrical storage device according to claim 4, wherein the joining part is a bonding layer.

12. The electrical storage device according to claim 8, wherein the joining part is a bonding layer.

13. The electrical storage device according to claim 9, wherein the first and second joining parts are first and second bonding layers, respectively.

14. The electrical storage device according to claim 1, wherein the outer case consists of metal.

15. The electrical storage device according to claim 1, wherein the bending strength of the electrode body is at least twice the bending strength of the first main wall.

16. The electrical storage device according to claim 1, wherein the bending strength of the electrode body is at least three times the bending strength of the first main wall.

17. The electrical storage device according to claim 1, wherein the case consists of only metal.

* * * * *